US 6,621,627 B2

United States Patent
Willner et al.

(10) Patent No.: US 6,621,627 B2
(45) Date of Patent: Sep. 16, 2003

(54) WDM FIBER AMPLIFIERS USING SAMPLED BRAGG GRATINGS

(75) Inventors: Alan E. Willner, Los Angeles, CA (US); Zhongqi Pan, Los Angeles, CA (US); Yong Xie, Fountain Valley, CA (US)

(73) Assignee: University of Southern California, Los Angeles, CA (US)

( * ) Notice: Subject to any disclaimer, the term of this patent is extended or adjusted under 35 U.S.C. 154(b) by 96 days.

(21) Appl. No.: 10/041,727

(22) Filed: Apr. 12, 2001

(65) Prior Publication Data

US 2002/0167722 A1 Nov. 14, 2002

Related U.S. Application Data

(60) Provisional application No. 60/197,932, filed on Apr. 13, 2000.

(51) Int. Cl.[7] .............................................. H01S 3/00
(52) U.S. Cl. ..................................................... 359/349
(58) Field of Search ........................... 359/337.21, 349

(56) References Cited

U.S. PATENT DOCUMENTS

| 5,457,760 A | * 10/1995 | Mizrahi ..................... 359/115 |
| 5,917,635 A | * 6/1999 | Cvijetic et al. ............. 359/130 |
| 6,049,417 A | * 4/2000 | Srivastava et al. ........ 359/337.4 |
| 6,049,418 A | * 4/2000 | Srivastava et al. ........ 359/337.4 |
| 6,160,658 A | * 12/2000 | Ishikawa ................... 359/130 |
| 6,304,370 B1 | * 10/2001 | Barnard .................... 359/341.1 |
| 6,307,668 B1 | * 10/2001 | Bastien et al. ............ 359/337.1 |
| 6,317,239 B1 | * 11/2001 | Burbidge et al. ........... 359/124 |
| 6,437,907 B1 | * 8/2002 | Yoon et al. ............. 359/341.32 |

FOREIGN PATENT DOCUMENTS

| JP | 2002261363 A | * 9/2002 | ............. H01S/3/10 |
| WO | WO 9942899 | * 8/1999 | ............ G02F/1/225 |

OTHER PUBLICATIONS

Agrawal, Govind P. Fiber–Optic Communication Systems. 1997. John Wiley & Sons, Inc. 2nd Edition. pp. 456–457.*
Xie et al. Spectrally efficient L–C band EDFA having continuous inter–band channel region using sampled FBGs. CLEO 2000. May 7, 2000–May 12, 2000. pp. 284–285.*
Ibsen et al. *99.9 Reflectivity Dispersion–less Square–filter Fibre Bragg Gratings for High Speed DWDM Networks*, Optical Fiber Communication Conference, Baltimore, Maryland. Mar. 7–10, 2000 pp. 230–233.
Yamada et al. *Broadband and gain–flattened amplifier composed of a 1.55μm–band and a 1.58–μm–band $Er^{3+}$–doped fiber amplifier in a parallel configuration*, Electronics Letters, 1997, vol. 33, No. 8 pp. 710–711.

* cited by examiner

Primary Examiner—Thomas G. Black
Assistant Examiner—Deandra Hughes
(74) Attorney, Agent, or Firm—Fish & Richardson P.C.

(57) ABSTRACT

Wideband optical amplifiers that use two parallel amplifiers in different operating spectral ranges and two different or identical sampled Bragg gratings as the channel splitter and combiner.

20 Claims, 7 Drawing Sheets

(C-Band EDFA)

(L-Band EDFA)

(L-C Band EDFA)

WDM FIBER AMPLIFIERS USING SAMPLED BRAGG GRATINGS

This application claims the benefit of U.S. Provisional Application No. 60/197,932, filed on Apr. 13, 2000.

BACKGROUND

This application relates to optical amplifiers, and more specifically, to fiber optical amplifiers for wavelength-division multiplexed (WDM) applications.

Optical fibers may be doped with active ions such as rare earth ions to operate as optical gain media. Under proper optical pumping conditions, such a doped fiber may be optically pumped at a pump wavelength within the absorption spectral band of the doped fiber and emit light at an emission wavelength that is longer than the pump wavelength and within the emission spectral band of the doped fiber. When an input optical signal at the emission wavelength is injected into the optically-pumped doped fiber, the input optical signal is amplified by the active ions which convert the pump energy into the optical energy at the emission wavelength.

Doped fibers may be designed to produce optical gain over a limited spectral range. In WDM applications, different optical channels at different WDM wavelengths may be amplified by using the same doped fiber amplifier. One commonly used fiber amplifier for the 1.5-micron band is the Erbium-doped fiber amplifier (EDFA). The typical bandwidth of some conventional EDFAs is about 30 nm and hence is much less than the low-loss bandwidth of commercial fibers. In order to fully use the available bandwidth of the fibers and to meet the demands for broad bandwidth in fiber communications, it is desirable to develop fiber amplifiers with wider bandwidths.

One way to expand the bandwidth of the optical fiber amplifiers is to use combine fiber amplifiers with different operating spectral ranges. For example, a fiber amplifier, e.g., a silica-based EDFA, in the L-C spectral band may use an EDFA in the C band from about 1530 nm to about 1560 nm and another EDFA in the L band from about 1570 nm to about 1600 nm a parallel EDFA configuration. In operation, input WDM channels may be split into C-band channels for amplification in the C-band EDFA and L-band channels for amplification in the L-band EDFA. The amplified C-band channels and L-band channels are then combined or "stitched" together to produce amplified channels in the L-C band from about 1530 nm to about 1600 nm.

SUMMARY

This application includes techniques and devices that combine two or more parallel fiber amplifiers of different operating spectral ranges with sampled Bragg gratings such as fiber Bragg gratings (FBGs) to achieve a wide operating spectral range for amplifying optical signals. A sampled fiber Bragg gratings may be designed to produce multiple Bragg reflection bands over a wide spectral range, e.g., over tens of nanometers, while each Bragg reflection band has a narrow bandwidth to carry a single WDM channel with a sharp roll-off at the band edge (e.g., a fraction of one nanometer). At last two sampled FBGs with about the same channel spacing may be used to split the input WDM channels for amplification by different fiber amplifiers and to combine amplified WDM channels from different fiber amplifiers together to produce the final amplified WDM channels.

This use of sampled FBGs may substantially reduce or eliminate the unusable spectral region between or in the is overlapping region of two fiber amplifiers with adjacent and different operating spectral ranges. In addition, the sampled FBGs effectively suppress amplified-spontaneous emission outside the WDM channel frequencies.

In one implementation, at least two sampled FBGs with about the same channel spacing but different operating spectral ranges may be used, where the Bragg reflection band at the highest channel frequency in the sampled FBG with a lower spectral range may be one channel spacing less than the Bragg reflection band at the lowest channel frequency in another sampled FBG with a higher spectral range. In another implementation, at last two sampled FBGs with about the same channel spacing and operating spectral ranges may be used.

DETAILED DESCRIPTION

Figure 1:
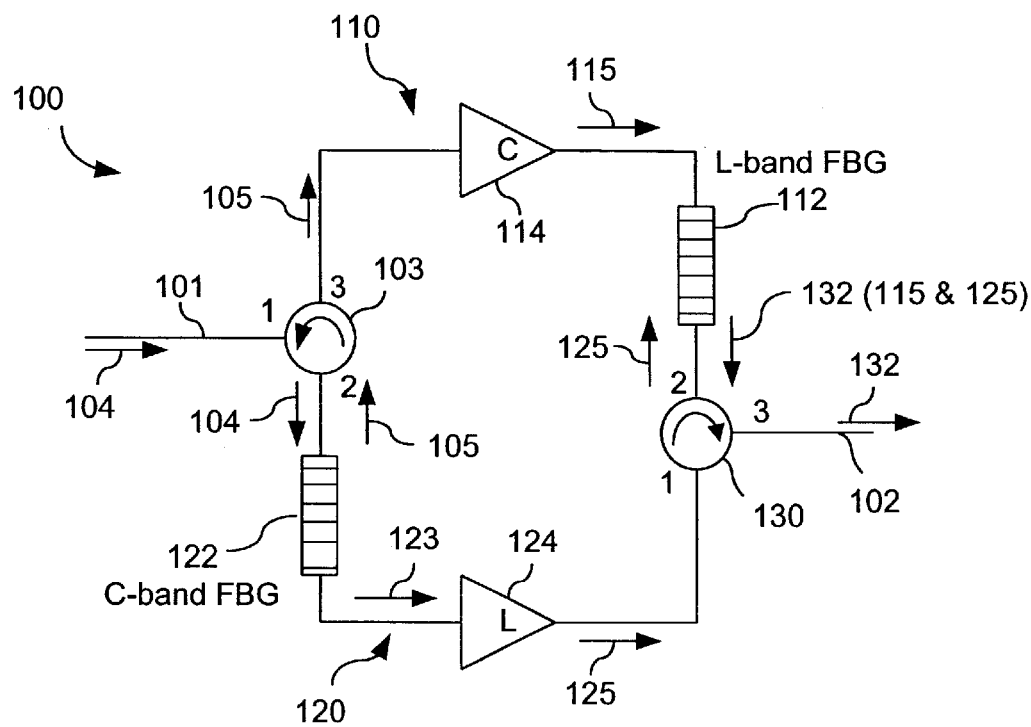
FIGS. 1 and 2 show fiber amplifiers that use two parallel fiber amplifiers in different operating spectral ranges and two different sampled FBGs as the channel splitter and combiner.

A L-C band silica-based EDFA with a C-band EDFA and a L-band EDFA in parallel operates by first splitting input WDM channels in a wide frequency span over both the L and C bands in the frequency domain into channels in the C band and channels in the L band. Upon amplification in two separate EDFAs, the L-band channels and the C-band channels are then combined in an output fiber to produce the amplified output channels. The above channel splitting in the frequency domain may be implemented by using a wideband wavelength-selective optical element to separate optical energy in a selective, continuous operating spectral range from optical energy outside that continuous operating spectral range. The channel combining may be done in a similar manner. Examples of such wideband wavelength-selective elements include a wavelength selective coupler and a wideband fiber Bragg grating.

Such a wideband device generally does not have a sharp transition at the edge of its continuous operating spectral range but has a gradual roll-off on the order of many nanometers or tens of nanometers. One result of this frequency roll-off is a "dead" frequency zone between the C-band channels and the L-band channels in which no signal channels can be properly transmitted. In some cases, this wasted bandwidth region may be in the range of 8 to 16 nm and hence results in a significant or even unacceptable amplifier overhead. It would be highly advantageous for system designers to be able to utilize this unusable interband wavelength region.

In recognition of the above, the techniques and devices of the present application use a distinctly different approach to the above channel splitting and combining in the frequency domain. Instead of using a wavelength-selective optical element to produce a continuous wideband in a selected spectral range (e.g., the C or L band), a sampled FBG is used to produce discrete, narrow spectral bands only at desired WDM channel frequencies in the selected spectral range (e.g., C or L band).

Such a sample FBG may be fabricated in a fiber with two overlapping spatial patterns: a spatial grating pattern and a spatial sampling pattern. The grating pattern is generally a spatial periodic grating pattern, e.g., a spatial modulation of the refractive index of the fiber core, and is formed in the fiber core along the longitudinal direction of the fiber. This grating pattern effectuates a Bragg grating in the fiber core. Such a Bragg grating can interact with a guided optical signal to selectively reflect each spectral component $\lambda_B(Z)$ within a Bragg reflection band that satisfies the Bragg condition, $\lambda_B(Z)=2n_{eff}(z)\Lambda(z)$, and transmits other spectral components that fail the Bragg condition, where z represents the position along the fiber, $n_{eff}(z)$ the effective index of refraction of the fiber, and $\Lambda(z)$ the period of the grating. The grating parameter, $n_{eff}(z)\Lambda(z)$, may be a constant along the fiber although it may also be a linearly or nonlinearly chirped function of the position z. In the present application, such a grating may be designed to produce a narrow Bragg reflection band to carry a single WDM channel. Since each Bragg reflection band is narrow, the edge at each side of the Bragg reflection band can be sharp, e.g., with a roll-off at a fraction of one nanometer. The spatial sampling pattern is also a periodic pattern either a constant sampling period or a chirped sampling period and may be formed in the fiber core. The sampling period is greater than the grating period. This sampling pattern is superimposed over and modulates the grating pattern to duplicate the Bragg reflection band produced by the grating pattern at different, discrete WDM channel frequencies. This feature of the sampling essentially uses discrete Bragg reflection bands to replace the continuous operating spectral range of aforementioned wideband devices.

A number of features may be achieved in a wideband fiber amplifier with parallel fiber amplifiers of different operating spectral ranges by using sampled FBGs. For example, the above dead spectral zone may be substantially reduced or eliminated because the sampling patterns of sampled FBGs may be designed to produce Bragg reflection bands at desired WDM channels so that the two different channels amplified by different fiber amplifiers but next to each other in frequency may be designed to separate by a few channel spacings or just one channel spacing. Since each of the Bragg reflection bands at different WDM frequencies is a narrow band to carry only one channel, its frequency roll-off at the band edge is sharp and may be only a fraction of one nanometer. Hence, the problem of the gradual roll-off at the band edge of many wideband devices with a continuous operating spectral range has been addressed. In addition, since optical energy at discrete frequencies of the Bragg reflection bands of the FBGs is selected for output and optical energy at other frequencies in the broad operating spectral ranges of the fiber amplifiers is rejected from the output, the sampled FBGs effectively suppress amplified spontaneous emission outside the WDM channel frequencies.

The following describes several embodiments of optical fiber amplifiers with two or more parallel fiber amplifiers of different operating spectral ranges by using sampled fiber Bragg gratings (FBGs) for splitting input WDM channels to be amplified and combining amplified WDM channels. It is understood that the specific reference to L and C bands is only exemplary and should not be construed as limitations.

FIG. 1 shows a L-C band fiber amplifier 100 with two parallel optical amplifying fiber branches, a first fiber branch 110 with a C-band EDFA 114 for amplifying WDM channels in the C band and a second fiber branch 120 with a different, L-band EDFA 124 for amplifying WDM channels in the L band. A first 3-port optical circulator 103 is used to couple an input fiber 101 which carries input L-C band WDM channels 104 and input fiber terminals of the two fiber branches 110 and 120 to direct an optical signal from the input fiber 101 connected to port 1, to the input fiber terminal of the second branch 120 connected to port 2, and to the input fiber terminal of the first fiber branch 110 connected to port 3. A second 3-port optical circulator 130 is used to couple an input fiber 102 and output fiber terminals of the two fiber branches 110 and 120 to direct an optical signal from the second fiber branch 120 connected to port 1, to the output fiber terminal of the first branch 110 connected to port 2, and to the output fiber 102 connected to port 3.

Two different sampled FBGs 122 and 112 are implemented at different positions to split input WDM channels and to combine the amplified WDM channels, respectively. The sampled FBG 122 is a C-band reflector that reflects WDM channels 105 at selected WDM channel wavelengths in the C band within the input L-C band WDM channels 104 and transmits optical signals at other wavelengths including L-band WDM channels 123. It is positioned in the fiber link between the coupler 103 and the L-band EDFA 124 in the second fiber branch 120 and operates as a channel splitter to transmit L-band WDM channels 123 to the L-band EDFA 124 and reflect the C-band WDM channels 105 to the first fiber branch 110 to be amplified by the C-band EDFA 114. The sampled FBG 112 a L-band reflector that reflects WDM channels at selected WDM channel wavelengths in the L band and transmits optical signals at other wavelengths including C-band WDM channels. It is positioned in the fiber link between the C-band EDFA 112 and the circulator 130 in the first fiber branch 110 to transmit amplified C-band WDM channels to the circulator 130 and reflect the amplified L-band WDM channels from the second fiber branch 120 back to the circulator 130. Both amplified L-band channels 125 and C-band channels 115 are combined by the L-band FBG 112 as amplified output channels 132 and are directed to the output fiber 102 by the circulator 130.

Figure 2:
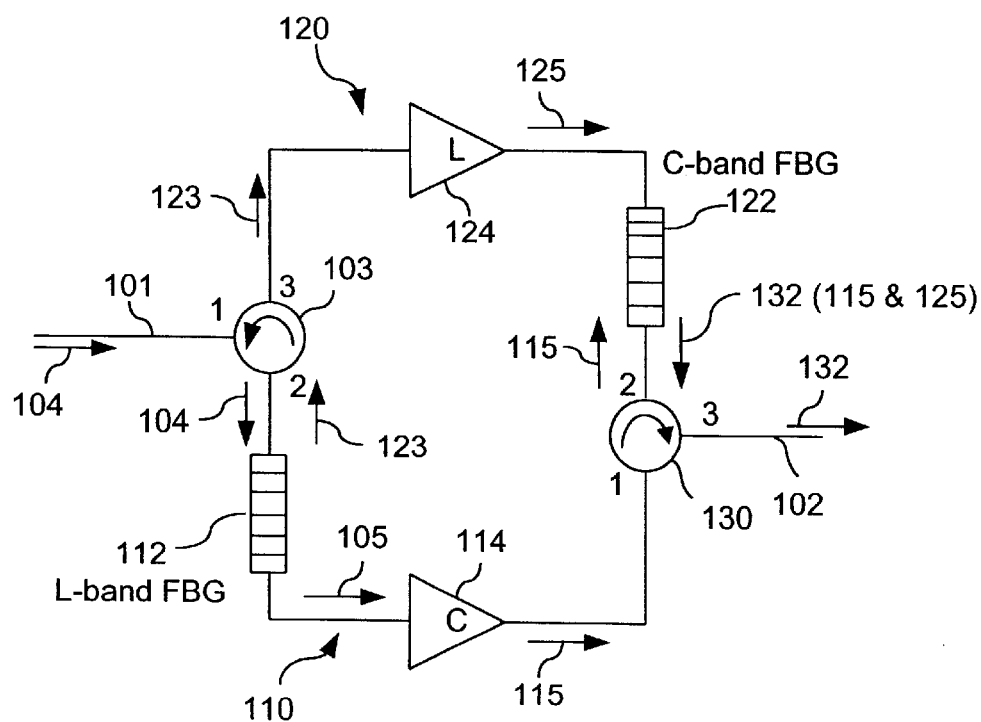

FIG. 2 shows another configuration that uses C-band FBG 122 and L-band FBG 112 in which the L-band FBG 112 is used as the channel splitter and the C-band FBG 122 is used as the channel combiner.

Figure 3:
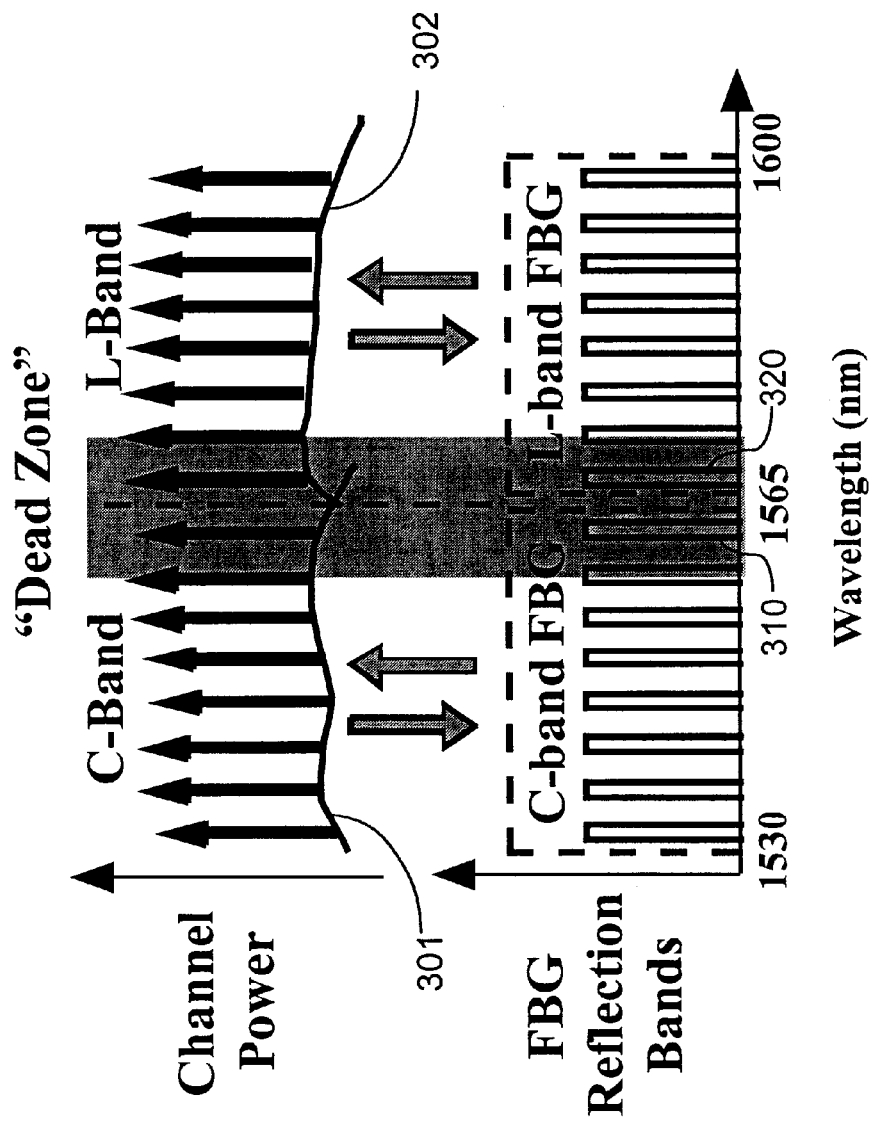
FIG. 3 shows the Bragg reflection bands of the two sampled FBGs and the gain profiles of the different fiber amplifiers used in FIGS. 1 and 2 according to one implementation.

FIG. 3 shows the Bragg reflection bands of the two sampled FBGs 112 and 122 and the gain profiles 301 and 302 of the EDFAs 114 and 124 according to one implementation. Under this implementation, the fiber amplifiers in FIGS. 1 and 2 may operate in the entire wavelength range covering the complete set of L- and C-bands. The sampled FBGs 112 and 122 may be configured to have reflection resonance bands throughout the L and C bands and interband region between the C and L bands such that the dead zone would be eliminated. Each of two sampled FBGs 112 and 122 may have multiple identical Bragg reflection bands that can be placed to within one unit of channel wavelength spacing (e.g., 0.8 or 1.6 nm) with respect to the other band.

Under this implementation, sampled FBGs 112 and 122 may be fabricated by imparting a periodic modulation onto the refractive index of a fiber Bragg grating, causing the grating to have a multiplicity of resonances. Eggleton et al., "Long periodic super structure Bragg gratings in optical fibres", Electron. Lett., vol. 30, pp. 1620–1622, 1994. The spacing between the resonances is uniform and can be tailored by varying the sampling period. The Bragg reflection bands of each sampled FBG may match all the ITU grids for WDM channels only in C or L band. As illustrated, the Bragg reflection band 310 at the highest channel frequency in the sampled FBG 114 for reflecting the C-band channels is one channel spacing less than the Bragg reflection band 320 at the lowest channel frequency in the sampled FBG 112 for reflecting L-band WDM channels. There is no dead gap between the Bragg reflection bands of the C-band FBG 122 and the Bragg reflection bands of the L-band FBG 112. Such FBGs can be fabricated by sampling a uniform FBG with a sinc modulation pattern to provide multiple reflection peaks in a desired bandwidth that have substantially the same signal amplitudes. Ibsen et al. disclosed sinc-sampled FBGs having up to 16 uniform channels with a channel spacing of 0.8 nm. Ibsen et al. "Sinc-sampled fiber Bragg gratings for identical multiple wavelength operation", IEEE Photonic. Tech. Lett., vol. 10, pp. 842–844, 1998. If each sampled FBG does not cover the desired spectral range such as L or C band, two or more sinc-sampled FBGs may be cascaded in series to operate as the FBG 112 or 122 in FIGS. 1 and 2 to over the C-band or L-band.

Figure 4:
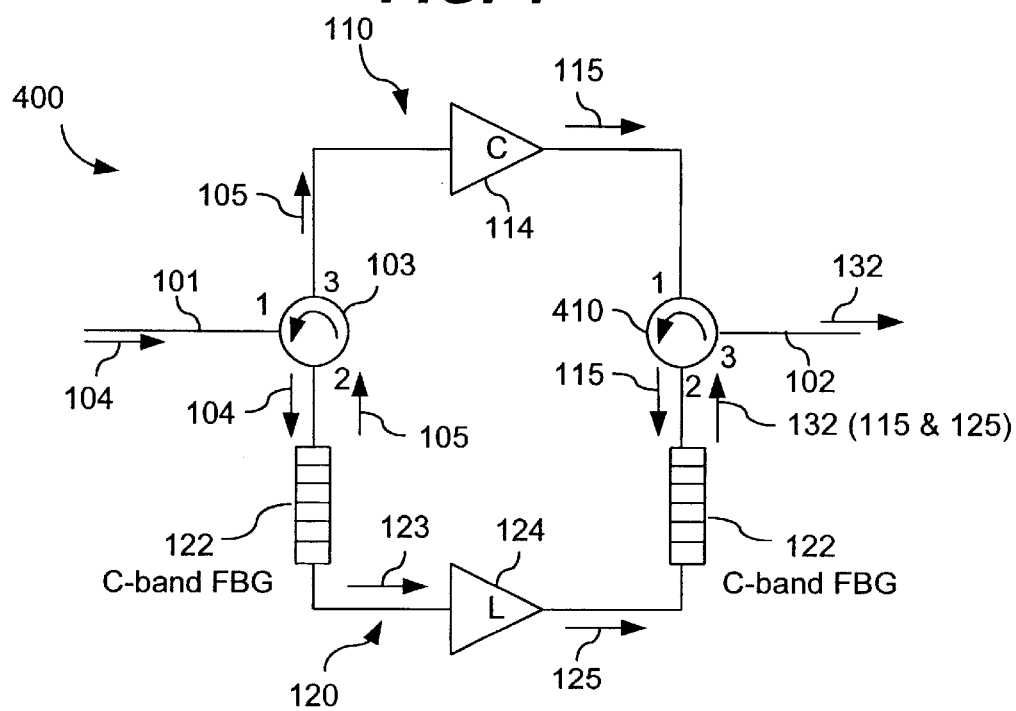
FIG. 4 shows a first example of a fiber amplifier that uses two parallel fiber amplifiers in different operating spectral ranges and two identical sampled FBGs as the channel splitter and combiner.
Figure 7:
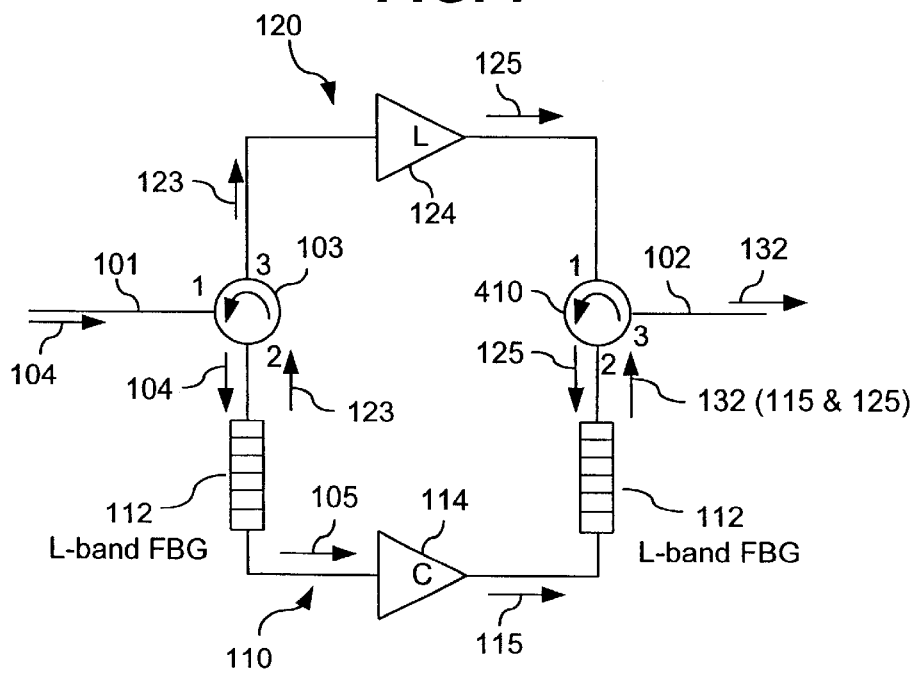
FIG. 7 shows a second example of a fiber amplifier that uses two parallel fiber amplifiers in different operating spectral ranges and two identical sampled FBGs as the channel splitter and combiner.

FIGS. 4 and 7 show alternative embodiments of L-C band fiber amplifiers that use two identical sampled FBGs in one fiber branch for channel splitting and combining. FIG. 4 shows a fiber amplifier 400 uses C-band FBG 122 in the first second branch 120, where the first C-band FBG 122 is connected between the circulator 103 and the L-band EDFA 124 and the second C-band FBG 122 is connected between the circulator 130 and the L-band EDFA 124. The first fiber branch 110 does not have a sampled FBG.

Figure 5:
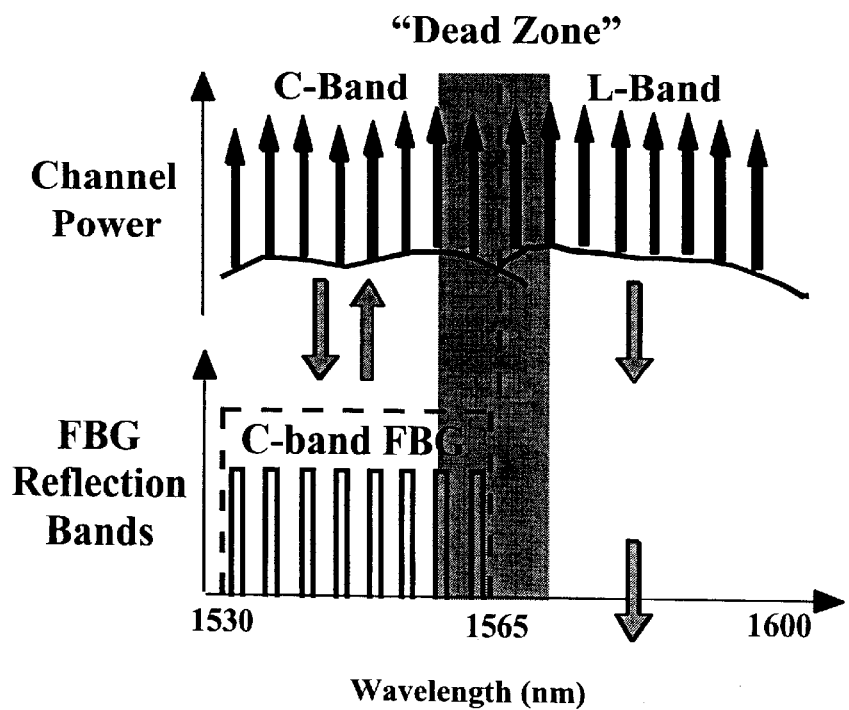
FIG. 5 illustrates certain properties and operations of the fiber amplifier in FIG. 4.

FIG. 5 shows the operation of the amplifier 400 in FIG. 4. The C-band FBG is designed to have its Bragg reflection bands located at desired ITU WDM grids where its highest Bragg reflection band is located one grad below the lowest WDM channel in the L band. The C-band channels are reflected at both FBGs, while the L-band channels pass through the two FBGs before combining with the C-band channels at the output port of the L-C band EDFA.

Figure 6:
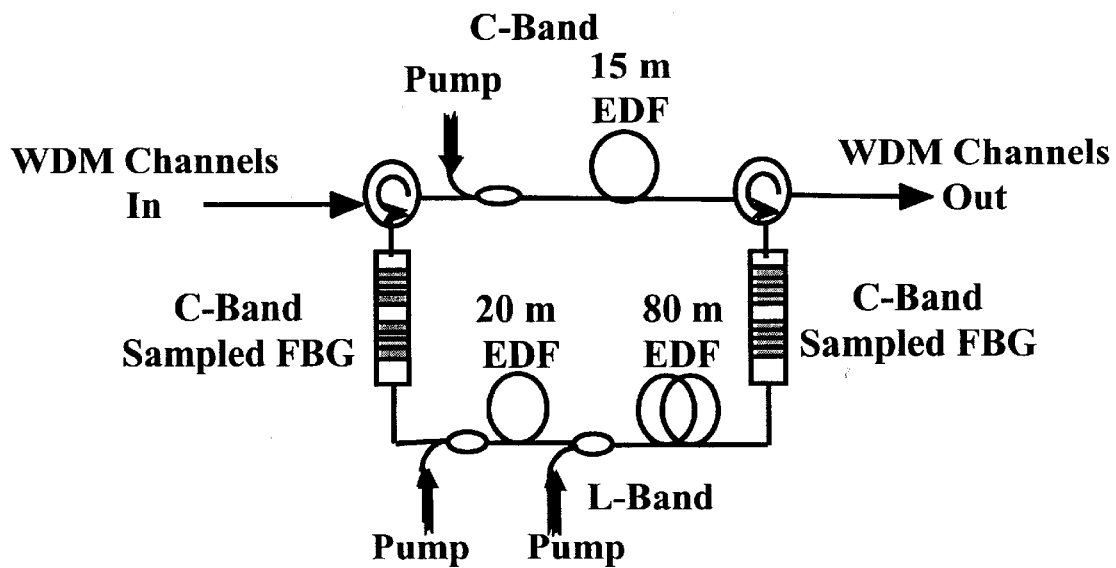
FIG. 6 shows one implementation of the fiber amplifier in FIG. 4.

FIG. 6 shows one implementation of the EDFAs 114 and 124 in the device 400 in FIG. 4. The L-band EDFA 124 has two amplification stages with 20-m and 80-m Erbium doped fibers, respectively. Both stages are optically pumped by lasers operating near 980 nm. A wavelength-selective fiber coupler, such as a WDM fiber coupler, may be used to couple the pump beam into the 20-m and 80-m fibers. The C-band EDFA 114 has a 25-m Er-doped fiber.

Figure 8:
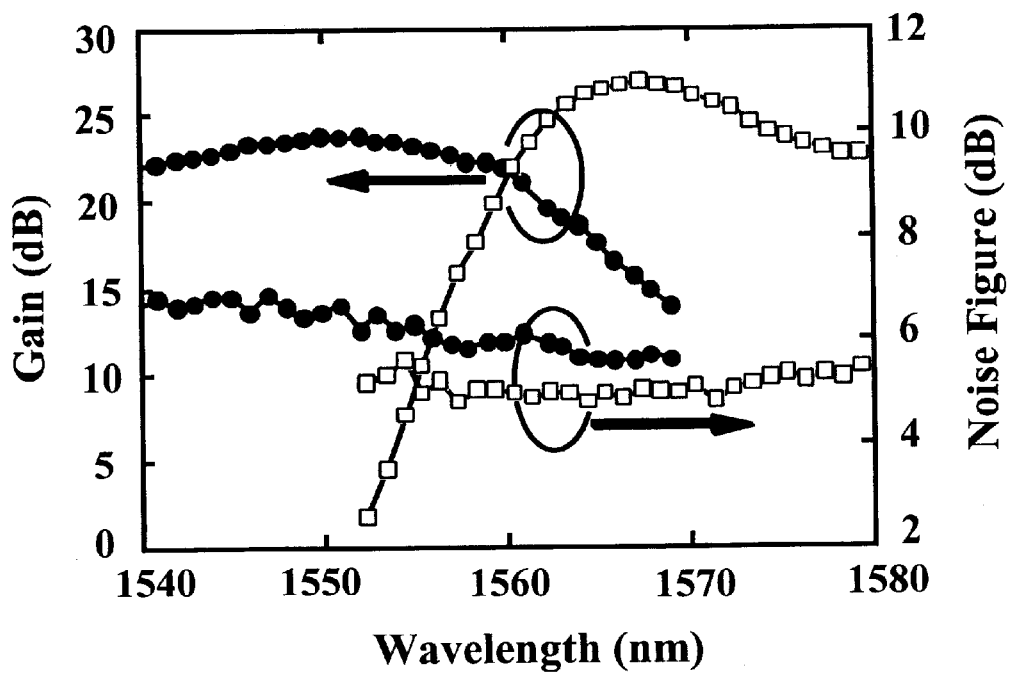
FIGS. 8, 9, 10A, 10B, 10C, and 11 show measurements of the fiber amplifier in FIG. 6.

FIG. 8 shows the gain and noise figure of the L-band and C-band EDFAs measured separately, where solid dots are data for C-band EDFA and hollow squares for L-band EDFA. A small signal gain higher than 22 dB and a noise figure lower than 7 dB is provided for both the bands, as well as the inter-band region. The noise figure of the C-band EDFA is slightly higher than that of the L-band EDFA because of its single stage structure. Although the characteristics for wavelengths longer than 1580 nm are not shown due to limitations in the wavelength tuning range of a particular signal source used in the measurements, the L-band amplifier can provide a flat gain for wavelengths up to 1600 nm, which was confirmed by observing the ASE noise spectrum of the saturated amplifier.

Figure 9:
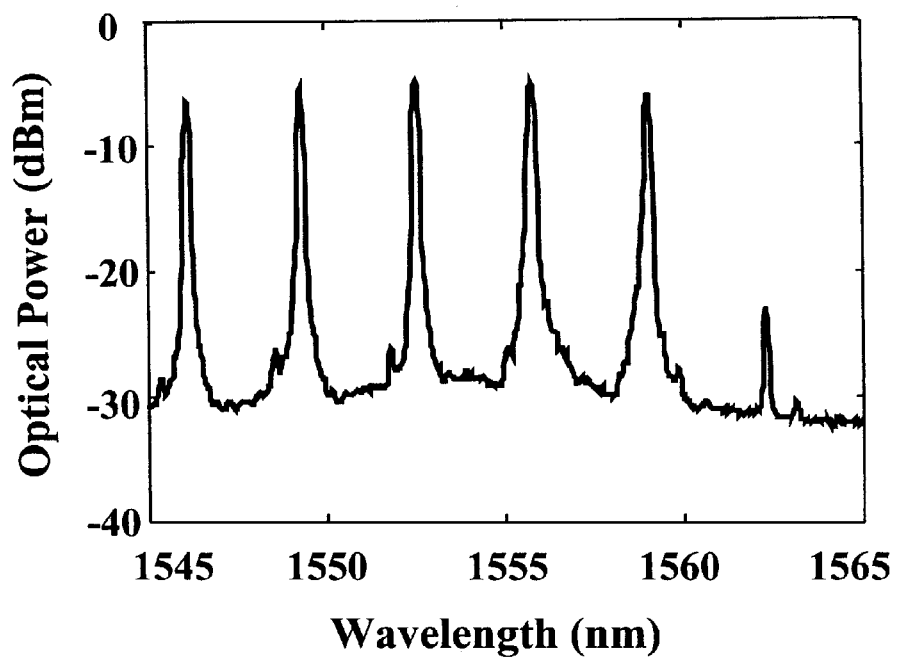

The two C-band FBGS used in FIG. 6 were sampled by square-wave periodic sampling patterns due to lack of sinc-sampling fabrication technology. The square-sampled FBGs were designed to have fewer resonances to keep high reflectivity for channels at the edge of the grating bandwidth. The two identical FBGs have multiple reflection peaks in the C-band and a channel spacing of 3.2 nm. FIG. 9 shows the measured reflection spectrum of one of the gratings. Each reflection peak has a 3-dB bandwidth of 0.2 nm. The reflectivity at 1559 nm, adjacent to the L-band signals, is about 92%. The small peak in the L-band due to square-sampling could be a severe problem if there is a channel at this wavelength. However, it can be completely eliminated if using sinc-sampled gratings or other sampling techniques.

To evaluate the system performance of the L-C band EDFA shown in FIG. 6, the bit-error-rate (BER) characteristics were measured by transmitting 4-channel 2.5 Gb/s, 215-1 PRBS data through the EDFA. A spacing between the highest C- and the lowest L-band channel of 1.6 nm was chosen in the measurement to demonstrate a continuous inter-band operation. Two C-band channels (1555.8 nm and 1559.0 nm) and two L-band channels (1560.6 nm and 1570.2 nm) were used in the system measurement.

Figures 10A, 10B, 10C:
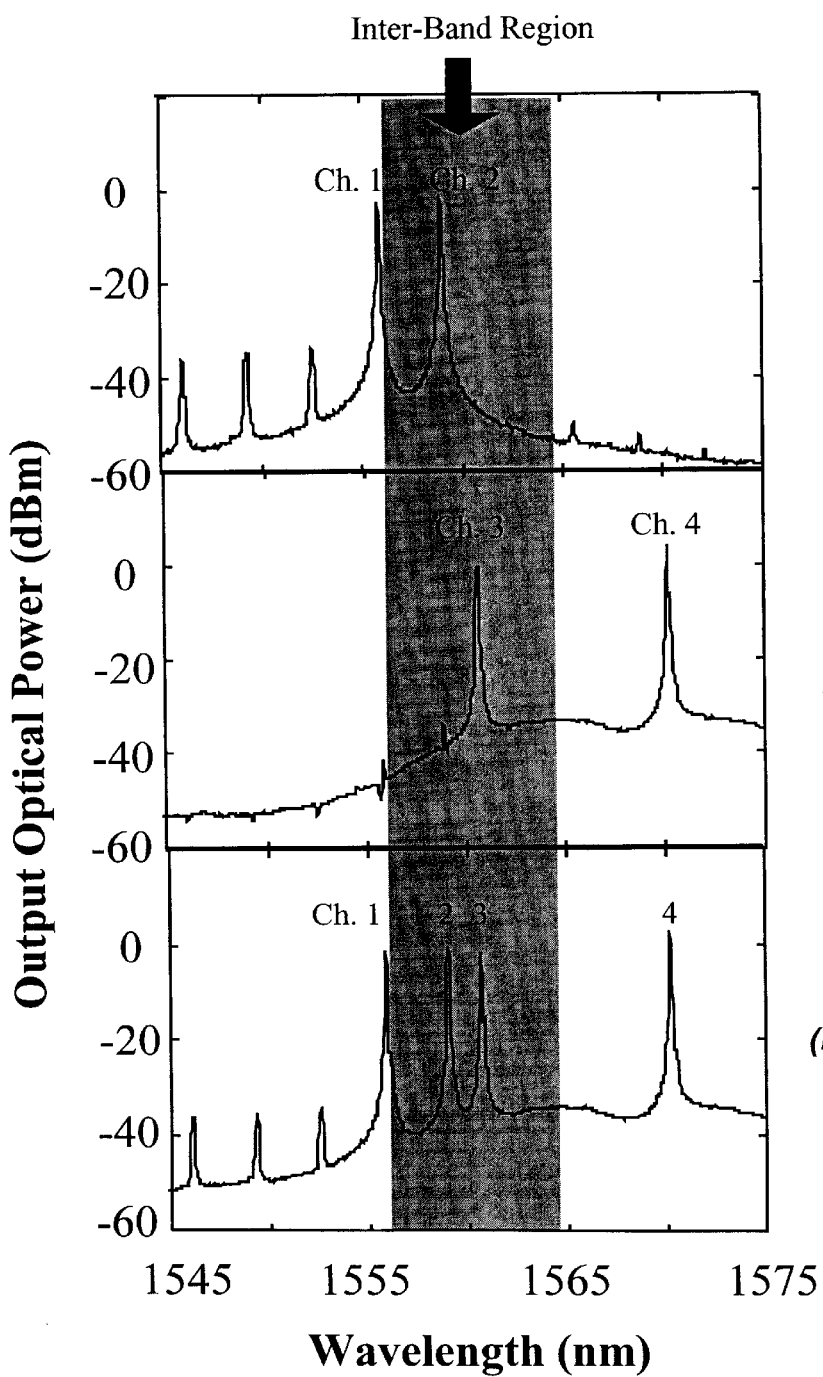
Figure 11:
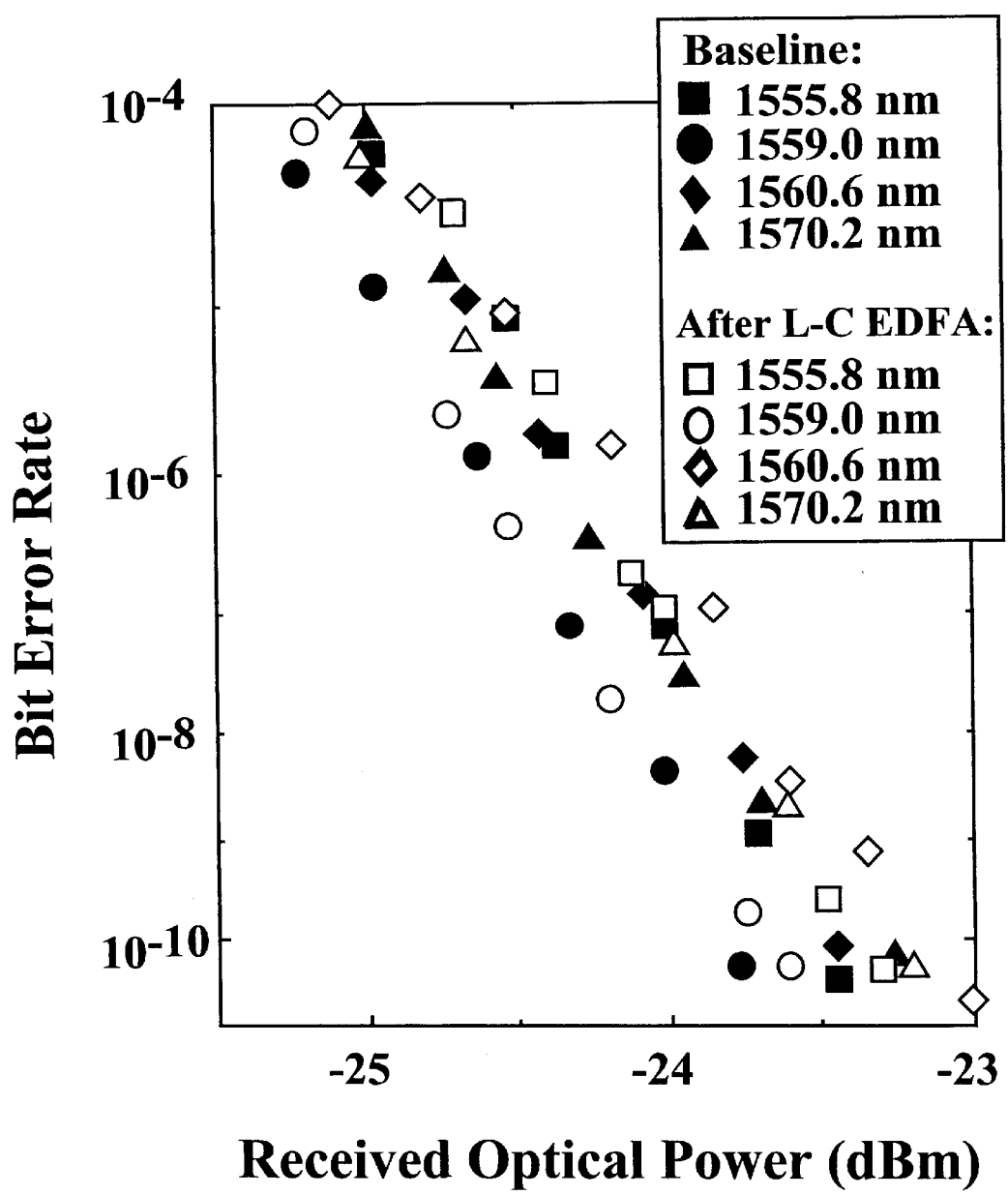

FIGS. 10A and 10B show the optical spectra measured at the output of the L-band EDFA and C-band EDFA, respectively. The coherent cross-talk induced by the grating splitter is lower than −30 dB for the two channels which are closest to band edge, and could be lower if using sinc-sampled gratings with higher reflectivity for channels in the inter-band region. FIG. 10C shows the output spectrum of the L-C band EDFA. The amplified-spontaneous-emission (ASE) noise level in C-band is suppressed by the C-band sampled FBGs, which is about 15 dB less than the noise level in L-band. Note that the ASE in both L- and C-band could be suppressed if using the schemes in FIGS. 1 and 2 where L-band and C-band FBGs are used. FIG. 11 further shows the BER results measured before and after the L-C band EDFA for all the channels. A power-penalty of less than 0.2 dB was obtained for all four channels after amplification.

For practical application, the impact of the FBG bandwidth should be considered when cascading the L-C band EDFAs. Since the signals are to be reflected by all the FBGs in the EDFA cascades, it is desirable that each of the FBG reflection-peaks should have a square-filter response to avoid the bandwidth-narrowing effect. An apodisation technique may be applied to fabricate such sampled FBGs for band-splitting. See, e.g., Ibsen et al., "99.9% reflectivity dispersion-less square-filter fibre Bragg gratings for high-speed DWDM networks", Conference on Optical Fiber Communications, Paper PD21, 2000.

Although the present disclosure only includes a few embodiments, it is understood that various modifications and enhancements may be made without departing from the spirit of the techniques and devices as described above. For example, three or more parallel EDFA at different operating spectral ranges may be used based on the techniques used in the above two-EDFA embodiments. Also, the fiber gratings may be replaced by Bragg gratings formed in waveguides other than fibers such as planar waveguides formed over substrates. Furthermore, the discrete narrow bands for carrying and filtering the WDM channels produced by the sampled FBGs may be generated by wavelength-selective elements other than sampled FBGs.

What is claimed is:

1. A device, comprising:
an input port carrying input WDM channels;

first and second optical paths respectively having a first optical amplifier to amplify optical energy in a first spectral range and a second optical amplifier to amplify optical energy in a second spectral range; and first and second sampled Bragg gratings, each configured to produce a plurality of discrete Bragg reflection bands at different frequencies of a portion of said input WDM channels to reflect optical energy in said Bragg reflection bands while transmitting optical energy at other frequencies, said first sampled Bragg grating coupled to said input port to split said input WDM channels into a first group of WDM channels in said first spectral range in said first optical path and a second group of WDM channels in said second spectral range in said second optical path, said second sampled Bragg grating coupled to said first and said second optical paths to combine said first and said second groups of WDM channels after amplification by said first and said second optical amplifiers, respectively, to produce amplified output WDM channels.

2. The device as in claim 1, wherein said first and said second sampled Bragg gratings are different from each other in that one sampled Bragg grating is configured to produce Bragg reflection bands in said first spectral range and is located in said first optical path while the other sampled Bragg grating is configured to produce Bragg reflection bands in said second spectral range and is located in said second optical path.

3. The device as in claim 2, wherein a Bragg reflection band at the highest channel frequency in one sampled Bragg grating with a lower spectral range is one channel spacing less than a Bragg reflection band at the lowest channel frequency in another sampled Bragg grating with a higher spectral range.

4. The device as in claim 2, wherein said first spectral range is in the C band and said second spectral range is in the L band.

5. The device as in claim 1, wherein said first and said second sampled Bragg gratings are substantially identical to each other and both are located in one of said first and said second optical paths.

6. The device as in claim 1, wherein at least one of said first and said second sampled Bragg gratings is a sampled Bragg grating formed in fiber.

7. The device as in claim 1, wherein at least one of said first and said second sampled Bragg gratings is a sampled Bragg grating formed in a planar waveguide on a substrate.

8. The device as in claim 1, wherein at least one of said first and said second sampled Bragg gratings includes at least two sampled Bragg gratings connected in series and respectively configured to produce Bragg reflection bands at two adjacent but different spectral ranges within one of said first and said second spectral ranges.

9. The device as in claim 1, wherein at least one of said first and said second optical amplifiers includes a doped fiber amplifier comprising:

a fiber having a doped fiber segment to produce a desired optical gain; and a fiber coupler coupled to said fiber to coupled an optical pump beam into said doped fiber segment.

10. The device as in claim 9, wherein said doped fiber segment is doped with rare earth ions.

11. A method, comprising:

using a sampled Bragged grating to produce a plurality of discrete reflection bands at different frequencies of a portion of input WDM channels, to split the input WDM channels at different frequencies into a first group of WDM channels in a first spectral range and a second group of WDM channels in a second, different spectral range, amplifying said first and said second groups of WDM channels separately; and using a sampled Bragg grating, which is configured to produce a plurality of discrete reflection bands at different frequencies of a portion of the input WDM channels, to combine said first and said second groups of WDM channels after amplification to produce amplified output WDM channels and to suppress spontaneous emission noise therein.

12. The method as in claim 11, wherein said first and said second wavelength-selective elements are different from each other in that one wave is configured to produce discrete reflection bands in said first spectral range while the other wavelength-selective element is configured to produce discrete reflection bands in said second spectral range, and said first and said second groups of WDM channels are amplified separately in two different optical paths, and further comprising:

placing said first and said second wavelength-selective elements in said two optical paths, respectively.

13. The method as in claim 12, wherein a discrete reflection band at the highest channel frequency in one wavelength-selective element with a lower spectral range is one channel spacing less than a Bragg reflection band at the lowest channel frequency in another wavelength-selective element with a higher spectral range.

14. The method as in claim 11, wherein said first and said second wavelength-selective elements are substantially identical to each other, and said first and said second groups of WDM channels are amplified separately in two different optical paths, and further comprising placing both wavelength-selective elements in one of said two optical paths.

15. The method as in claim 11, further comprising using at least two sampled Bragg gratings connected in series to operate as said first or said second wavelength-selective element, said two sampled Bragg gratings respectively configured to produce Bragg reflection bands at two adjacent but different spectral ranges within a respect spectral range of said first and said second spectral ranges.

16. A device, comprising:

an input optical circulator configured to direct an optical signal from a first port to a second port, and an optical signal from said second port to a third port, said input optical circulator operable to receive input WDM channels at different frequencies;

a first sampled fiber Bragg grating coupled to said second port to receive said input WDM channels and configured to reflect a first group of WDM channels in a first spectral range and to transmit a second group of WDM channels in a second spectral range;

a first fiber amplifier coupled to said third port to receive said first group of WDM channels and configured to amplify optical energy in said first spectral range;

a second fiber amplifier coupled to said first sampled fiber Bragg grating to receive said second group of WDM channels and configured to amplify optical energy in said second spectral range;

an output optical circulator configured to direct signals from a first port, to a second port, and to a third port, and coupled to receive output from said second fiber amplifier at said first port and output from said first fiber amplifier at said second port, and to produce an output at said third port; and a second sampled Bragg grating configured to reflect said second group of WDM channels in said second spectral range and to transmit said first group of WDM channels in said first spectral range, coupled between said output optical circulator and said first fiber amplifier to transmit said first group of WDM channels to said second port of said output optical circulator and operable to reflect said first group of WDM channels from said first fiber amplifier back to said second port so that said first and said second groups of WDM channels after amplification are combined at said second port of said output optical circulator and to be output at said third port.

17. The device as in claim 16, wherein one of said first and said second spectral ranges is in the L band and another of said first and said second spectral ranges is in the C band.

18. The device as in claim 16, wherein a Bragg reflection band at the highest channel frequency in one sampled Bragg grating with a lower spectral range is one channel spacing less than a Bragg reflection band at the lowest channel frequency in another sampled Bragg grating with a higher spectral range.

19. The device as in claim 16, wherein at least one of said first and said second sampled Bragg gratings includes at least two sampled Bragg gratings connected in series and respectively configured to produce Bragg reflection bands at two adjacent but different spectral ranges within one of said first and said second spectral ranges.

20. The device as in claim 16, wherein at least one of said first and said second optical amplifiers includes a doped fiber amplifier comprising:
   a fiber having a doped fiber segment to produce a desired optical gain; and
   a fiber coupler coupled to said fiber to coupled an optical pump beam into said doped fiber segment.

* * * * *